United States Patent [19]

Heimberg et al.

[11] Patent Number: 4,847,339

[45] Date of Patent: Jul. 11, 1989

[54] PROCESS FOR PREPARING INTERPOLYMERS OF ETHYLENE, VINYL ACETATE, AND REACTIVE HALOGEN-CONTAINING MONOMERS

[75] Inventors: Manfred Heimberg, Cincinnati; Louis J. Rekers, Wyoming, both of Ohio

[73] Assignee: National Distillers and Chemcial Corporation, New York, N.Y.

[21] Appl. No.: 10,243

[22] Filed: Feb. 2, 1987

[51] Int. Cl.$^4$ .............................................. C08F 2/24
[52] U.S. Cl. ........................................ 526/80; 526/87; 526/292.1; 526/292.9
[58] Field of Search .................... 526/209, 225, 292.1, 526/292.6, 292.7, 292.9, 80, 87

[56] References Cited

U.S. PATENT DOCUMENTS

| | | | |
|---|---|---|---|
| 2,409,679 | 10/1946 | Hanford | 526/292.7 |
| 3,370,031 | 2/1968 | Grommers | 526/209 |
| 3,976,610 | 8/1976 | Morris | 526/292.6 |
| 4,056,497 | 11/1977 | Reinecke | 526/292.6 |

*Primary Examiner*—Christopher Henderson
*Attorney, Agent, or Firm*—Kenneth D. Tremain; Gerald A. Baracka

[57] ABSTRACT

An improved emulsion polymerization process for the preparation of high Mooney viscosity terpolymers of ethylene, vinyl acetate, and reactive halogen-containing monomers is provided. In the process, the reactive halogen-containing monomer is added during the polymerization. The ethylene pressure may also be increased during the polymerization.

17 Claims, No Drawings

PROCESS FOR PREPARING INTERPOLYMERS OF ETHYLENE, VINYL ACETATE, AND REACTIVE HALOGEN-CONTAINING MONOMERS

BACKGROUND OF THE INVENTION

1. Field of the Invention

This invention relates to an improved process for the preparation of high Mooney viscosity interpolymer elastomers of ethylene, vinyl acetate and reactive halogen-containing monomers, such as vinyl chloroacetate (VCA). The incorporated halogen-containing units serve as cure sites for vulcanization. More particularly, the process is directed to novel methods for introducing the vinyl chloroacetate cure site monomer during polymerization so that interpolymer elastomer products which exhibit increased tensile strength properties upon vulcanization are obtained.

2. Background of Invention

The production of ethylene-vinyl acetate-vinyl chloroacetate (E/VA/VCA) interpolymer elastomers is known in the art. For example, Kaizerman et al., in U.S. Pat. No. 3,972,857, prepare E/VA/VCA interpolymers by chemically reacting an ethylene-vinyl acetate (EVA) copolymer elastomer with chloroacetic acid in xylene solution using p-toluenesulfonic acid as the catalyst. Acetic acid, produced by acidolysis of the EVA copolymer by the chloroacetic acid, is removed by distillation and the EVA copolymer, now containing chemically-introduced VCA units, is obtained by precipitation with isopropyl alcohol. Elastomers containing from 0.2 to 4.5 weight percent chlorine which can be vulcanized with soap/sulfur cure systems are obtained.

Another method of producing soap/sulfur vulcanizable ethylene-vinyl acetate elastomer compositions is that of Chang et al. in U.S. Pat. No. 4,202,845. Chang et al. graft an acrylate ester monomer along with a vinyl chloroacetate cure site monomer onto an elastomeric EVA copolymer backbone.

As indicated, both of the above compositions which contain reactive halogen cure sites undergo soap/sulfur vulcanization to obtain useful elastomeric products. Typically, soap/sulfur vulcanization involves, in addition to elastomer and carbon black reinforcing agent, a soap such as sodium stearate or sodium 2-ethylhexanoate, sulfur, stearic acid and an antioxidant. No unsaturation is required in the elastomer for soap/sulfur vulcanization. While the exact mechanism is uncertain, there are indications that —$S_x$— crosslinks are introduced [Kaendler et al., Die Angewandte Makromolekulare Chemie, 29/30, 241(1973)]. In any event, soap/sulfur vulcanization differs fundamentally from conventional sulfur vulcanization where carbon-carbon double bond unsaturation must be present in the elastomer.

There are several disadvantages associated with the aforesaid chemical processes of Kaizerman et al. and Chang et al. for introducing cure sites into ethylene-vinyl acetate copolymer elastomers. First of all for Kaizerman et al., a multi-step procedure is involved which increases costs. The EVA first has to be synthesized, then dissolved in xylene, and thereafter reacted with chloroacetic acid in a relatively slow, complicated solvent process. The chemically modified product must then be recovered by precipitation with a nonsolvent, such as isopropyl alcohol, and dried. Recovery, separation and purification of solvent and non-solvent are required for commercial operation.

The Chang et al. graft polymerization is also a multi-step process and suffers from the attendant increases in cost. The EVA elastomer must first be synthesized and then grafted in a slurry process with a substantial amount of relatively expensive acrylate ester monomer, said graft process also incorporating the VCA cure sites into the finished graft composition.

It would be highly desirable and advantageous if a simple, low cost procedure for interpolymerizing ethylene and vinyl acetate with a comparatively small amount of VCA or other similar halogen-containing cure site monomer were available. It is, however, recognized among polymer chemists that VCA is a rather potent chain transfer agent. This propensity to chain transfer tends to limit the molecular weight of the interpolymers that can be produced using VCA as the cure site monomer. The aforesaid chain transfer character of the cure site monomer becomes even more of a problem at higher temperatures such as are employed for conventional high pressure polymerization processes. Thus, in order to produce sufficiently high molecular weight E/VA/VCA interpolymer elastomers, the polymerizations have typically been conducted at relatively low temperatures by redox-initiated polymerization in aqueous emulsion or solution.

One such method for the emulsion polymerization of ethylene, vinyl acetate and vinyl chloroacetate is disclosed by Becker et al. in U.S. Pat. No. 4,098,746. Becker et al. disclose that the polymerization may be carried out in a batch process or by feeding the monomers to the reaction medium. They also indicate the polymerization can be carried out at a constant, increasing, or decreasing ethylene pressure. There is, however, no disclosure by Becker et al. of what effect the manner or rate of varying ethylene pressure or monomer addition during the interpolymerization process might have on the properties of the interpolymer. Moreover, when Becker et al. add VCA monomer during the course of the polymerization, it is introduced as a dilute solution (up to about 10 weight percent) in vinyl acetate monomer, as such or as an aqueous emulsion. Addition of VCA monomer alone or at relatively high concentrations in vinyl acetate monomer is not suggested by Becker et al. Furthermore, Becker et al. do not employ soap/sulfur cure systems but rather utilize cross-linking agents, such as aminoplast resins, polyamines, polyamidoamines, or mixtures of formaldehyde and ammonia or amine, for cross-linking.

Heimberg in U.S. Pat. No. 4,287,329 discloses an emulsion polymerization process for synthesizing EVA elastomers of low gel content containing about 40% to about 70% by weight of vinyl acetate and having Mooney viscosities of about 30 to 80. In contrast to EVA elastomers of the art produced by high pressure polymerization processes conducted at relatively high temperatures and which seldom have Mooney viscosities much in excess of about 20 and as a result are soft and tacky and very difficult to handle and compound on rubber processing equipment, the high Mooney viscosity emulsion elastomers of Heimberg are less tacky and present much less difficulty in handling and compounding on the rubber mill.

SUMMARY OF THE INVENTION

We have now quite unexpectedly discovered an improved process whereby high Mooney viscosity interpolymers of vinyl acetate, ethylene, and reactive halogen-containing cure site monomers are readily produced. More specifically, the present invention is directed to a process wherein ethylene, vinyl acetate, and a halogen-containing monomer, such as vinyl chloroacetate, are polymerized to produce improved interpolymers, namely, high Mooney viscosity interpolymer elastomers which upon soap/sulfur vulcanization have increased tensile strengths. In one embodiment of the invention, the cure site monomer is introduced incrementally or continuously during the course of the polymerization process instead of at the start of the polymerization. In another embodiment, the halogen-containing cure site monomer is added to the polymerization neat or diluted with the vinyl acetate monomer at a concentration of at least 20 weight percent. In yet another embodiment, the ethylene pressure is also increased throughout the course of the polymerization.

More specifically, the process relates to the interpolymerization of ethylene, vinyl acetate, and a halogen-containing cure site monomer in an aqueous emulsion containing a nonionic surface active agent, an anionic surface active agent, and a free radical polymerization catalyst to obtain a soap/sulfur vulcanizable elastomer containing from 40 to 70 weight percent vinyl acetate and 0.2 to 2 weight percent chlorine, wherein the improvement comprises conducting the polymerization at a temperature from 5° C. to 80° C. and, more preferably, from 20° C. to 55° C. and ethylene pressure of 400–4000 psig, and adding the halogen-containing monomer after the polymerization is initiated, said addition being made continuously or intermittently over at least one-twentieth of the total polymerization period. In another embodiment of the invention, a process is provided wherein the improvement comprises conducting the polymerization at a temperature from 5° C. to 80° C. and, more preferably, from 20° C. to 55° C. and adding the halogen-containing monomer after the polymerization is initiated continuously or intermittently over at least one-twentieth of the total polymerization period, and increasing the ethylene pressure during the polymerization from 400–900 psig at the outset up to 2000–4000 psig by the end of the polymerization period. The halogen-containing cure site monomer is preferably vinyl chloroacetate which can be added to the polymerization neat, i.e., by itself, or in solution diluted with the vinyl acetate monomer. Where a solution of vinyl chloroacetate and vinyl acetate is employed, the concentration of the halogen-containing cure site monomer in vinyl acetate is at least 20 weight percent. No more than about one-half of the total vinyl acetate monomer charge is employed for this purpose—the remainder of the vinyl acetate monomer being charged to the reactor prior to initiation of the polymerization. When the vinyl chloroacetate is charged to the polymerization neat, it is preferred that all of the vinyl acetate monomer is present in the reactor when the polymerization is initiated although it is possible to add up to about one-half of the vinyl acetate as a separate stream during the course of the polymerization.

DETAILED DESCRIPTION OF THE INVENTION

The terpolymers of this invention can have either ethylene or vinyl acetate as the predominant monomer. When utilizing vinyl chloroacetate as the halogen-containing cure site monomer, the compositions will be referred to as ethylene-vinyl acetate-vinyl chloroacetate (E/VA/VCA) interpolymers. If vinyl acetate is the predominant monomer the interpolymers are sometimes referred to as vinyl acetate-ethylene-vinyl chloroacetate (VA/E/VCA) interpolymers.

Generally, the interpolymers have from about 40 to about 70 weight percent and, more preferably, from about 55 to about 65 weight percent vinyl acetate incorporated therein. They generally contain from about 0.2 to about 2 weight percent chlorine. More commonly, the chlorine content is 0.5 to 1 weight percent. When the halogen-containing cure site monomer is VCA, these chlorine content ranges correspond to 0.68 to 6.8 and 1.7 to 3.4 weight percent incorporated VCA, respectively. The balance of the interpolymer composition consists of incorporated ethylene units and units of any other ethylenically unsaturated monomers which are included in the polymerization. Ethylene generally constitutes from about 25 to 60 weight percent and, more preferably, from about 30 to 45 weight percent of the elastomer.

Reactive halogen-containing monomers which can be utilized as cure site monomers are vinyl monomers selected from the group consisting of vinyl chloroacetate, vinyl bromoacetate, vinyl 2-chloropropionate, vinyl 2-chlorobutyrate, vinyl 2-chloroisobutyrate, and 2-chloroethyl vinyl ether. Glycidyl acrylate and glycidyl methacrylate may also be employed as the reactive monomer as can other halogen-containing monomers such as allyl chloroacetate, vinyl 3-chloropropionate, vinyl 4-chlorobutyrate, haloacrylate esters, such as 2-chloroethyl methacrylate, vinylbenzyl chloride, and the like. Vinyl chloroacetate is a particularly useful cure site monomer for the process of the invention.

Other ethylenically unsaturated monomers may also be included with the ethylene, vinyl acetate and halogen-containing cure site monomer. If employed, these monomers are present in amounts typically not exceeding about 10 weight percent of the total interpolymer elastomer. Included among such additional comonomers are monoethylenically unsaturated aliphatic hydrocarbons such as propylene and isobutylene; halogen-containing olefinic monomers such as vinyl fluoride, vinyl chloride, vinyl bromide, vinylidene difluoride, 1-chloro-1-fluoro-ethylene, chlorotrifluoroethylene and tetrafluoroethylene; unsaturated monocarboxylic acid monomers such as acrylic acid, methacrylic acid, and crotonic acid, as well as polymerizable derivatives thereof, e.g., alkyl acrylates and methacrylates such as methyl acrylate, ethyl acrylate, n-propyl acrylate, n-butyl acrylate, isobutyl acrylate, 2-ethylhexyl acrylate, methyl methacrylate, ethyl methacrylate, n-propyl methacrylate, isobutyl methacrylate, 1,6-hexanediol diacrylate, acrylonitrile, methacrylonitrile, acrylamide, methacrylamide, N-methylolacrylamide, N-methoxymethylacrylamide and N-butoxymethylacrylamide, and acrolein; alkyl esters of monoethylenically unsaturated dicarboxylic acids, e.g., diethyl maleate, dibutyl maleate, dioctyl maleate, dipropyl fumarate, dibutyl fumarate, dioctyl fumarate, didodecyl fumarate, dibutyl itaconate and dioctyl itaconate; aliphatic vinyl esters such as vinyl formate, vinyl propionate, vinyl trimethylacetate, and vinyl butyrate; aliphatic vinyl ethers such as methyl vinyl ether, ethyl vinyl ether and n-butyl vinyl ether; vinyl ketones such as methyl vinyl ketone, ethyl vinyl ketone, and butyl vinyl ketone.

The polymerization may be carried out as a batch process or a continuous process. It may be performed in bulk, without solvent, with only monomers and auxiliary adjuvants such as initiators present to promote the polymerization process or it may be performed in solution in a suitable solvent, e.g., methanol, t-butyl alcohol, toluene, etc. Preferably, it is carried out as an emulsion polymerization process in an aqueous medium.

The process is most generally carried out as a batch emulsion polymerization process but it is within the scope of this invention to carry out the process in a series or "cascade" of successive batch reactors wherein the polymerizing system is pumped from one reactor to the next, as the polymerization reaction progresses, and in that manner approaches a continuous process.

When the interpolymerization process of this invention is carried out in aqueous emulsion, a nonionic and anionic surfactant, a catalyst, a buffer, ferrous sulfate heptahydrate and a reducing agent are included with the water and monomers. Generally, the surfactants, catalyst, buffer, and ferrous sulfate heptahydrate are dissolved in deionized water and added directly to the reactor before starting the polymerization. The vinyl acetate monomer is then added although, if desired, it may be added in part during the polymerization. Most generally, the major portion (more than one-half) of the vinyl acetate is added to the reactor before polymerization is commenced. The initial ratio of water to vinyl acetate monomer in the polymerization can range from about 40 parts to about 1700 parts per 100 parts of vinyl acetate monomer with a ratio of about 75 to about 120 parts of water per 100 parts of vinyl acetate monomer being preferred. After the vinyl acetate monomer has been added, the reactor is closed, the stirrer is started, and air is displaced from the interior of the reactor and lines leading to it by alternately imposing and releasing nitrogen pressure. Thereafter, ethylene pressure is applied to the reactor and the contents thereof are stirred and heated to the desired polymerization temperature. The ethylene pressure is adjusted to that selected for the polymerization and the polymerization is started by pumping a small amount of reducing agent solution into the reactor. Once the polymerization has started, the flow of reducing agent is adjusted to a constant level and maintained throughout the polymerization.

As indicated, a nonionic surfactant and an anionic surfactant are employed. The nonionic surfactant may vary from about 2.5 to about 10 parts per 100 parts of vinyl acetate monomer charged. Preferably about 2.75 to about 4 parts nonionic surfactant per 100 parts vinyl acetate is used. In general, as the level of nonionic surfactant is reduced, elastomers of maximum Mooney viscosity tend to be produced. However, the most favorable level of nonionic surfactant is best established by experiment. About 0.1 to about 1 part of anionic surfactant to 100 parts of vinyl acetate monomer may be employed, whereas the preferred ratio is 0.25 to 0.75 part per 100 parts of vinyl acetate monomer. All of the nonionic and anionic surfactant may be present in the polymerization medium at the outset, as hereinabove disclosed, or, if desired, one or both may be added incrementally, either totally or in part.

Nonionic surface active agents which can be employed for the improved polymerization process of this invention are any of the conventional nonionic surfactants known for the preparation of EVA and VAE copolymer and terpolymer latices. These products typically contain one or more water-soluble oxyalkylene moieties, such as a polyoxyethylene or polyoxy(ethylene/propylene) group. Useful nonionic surfactants of this type are described in U.S. Pat. Nos. 2,674,619, 2,677,700, and 4,287,329, the teachings of which are incorporated herein by reference thereto. Mixtures of one or more nonionic surfactants may also be advantageously employed for the interpolymerization. Tetronic 908 is a particularly useful nonionic surfactant.

Just as with the nonionic surfactants, conventional anionic surface active agents heretofore known for the emulsion polymerization of ethylene with vinyl acetate are also useful for the present process. Among the many anionic surface active agents which can be used herein are Triton X-200 (Rohm & Haas Co.), a sodium salt of an alkylaryl polyether sulfonate; Triton QS-9 (Rohm & Haas Co.), a phosphate ester; Alipal CO 433 (GAF), a sodium salt of sulfated nonylphenol (ethyleneoxy) ethanol; Dupanol ME Dry (Du Pont), a sodium lauryl sulfate; and Emersal 6453 (Emery Chemicals), a 25% active aqueous solution of sodium lauryl ether sulfate. Emersal 6453 is a particularly useful anionic surfactant.

The catalysts used in the copolymerization reaction are any of the known and conventional free radical polymerization catalysts heretofore used for the preparation of EVA copolymer latices and include inorganic peroxygen compounds such as hydrogen peroxide, sodium perchlorate and sodium perborate; inorganic persulfates such as sodium persulfate, potassium persulfate and ammonium persulfate. The catalyst is generally utilized at a level of from about 0.05% to about 3% by weight based on the vinyl acetate monomer charged. Most usually about 0.2% to 1% catalyst is employed. Ammonium persulfate is a particularly useful catalyst.

It is preferred in the process of this invention to initiate and maintain the polymerization by gradually adding a small amount of a reducing agent (sometimes called a co-catalyst) to the reactor. Initiating species are produced by reaction of the catalyst with the reducing agent (redox activation). The reducing agent may be sodium hydrogen sulfite, sodium meta bisulfite, sodium hydrosulfite and sodium formaldehyde sulfoxylate. Sodium formaldehyde sulfoxylate is preferred. The reducing agent is conveniently added in aqueous solution. The concentration of the reducing agent will broadly range from 0.1 to 2 weight percent and, more usually, from 0.25 to 0.75 weight percent of the aqueous solution.

Low levels of ions derived from variable valence transition metal salts are advantageously utilized as promotors during redox initiation of these polymerizations. Ferrous sulfate heptahydrate is a preferred salt for this purpose. From about 0.0005 to about 0.05 part and, more preferably, 0.001 to 0.01 part of the salt per 100 parts of vinyl acetate monomer is utilized. Also, an alkaline buffering agent such as sodium bicarbonate, ammonium bicarbonate, sodium acetate, and the like, may be added to the aqueous system to maintain the pH at the desired value. The amount of buffer is generally about 0.10 to 1.0% by weight, based on the vinyl acetate monomer.

While it is not essential for the interpolymerization process of the present invention, a protective colloid of the type generally known to the art can be included during the polymerization. Such known and conventional protective colloids as the partially and fully hydrolyzed polyvinyl alcohols; cellulose ethers, e.g., hydroxymethyl cellulose, hydroxyethyl cellulose, ethyl hydroxyethyl cellulose and ethoxylated starch derivatives; the natural and synthetic gums, e.g., gum tragacanth and gum arabic; polyacrylic acid, and poly(- methyl vinyl ether/maleic anhydride), are well suited for use herein.

For the improved process of this invention whereby high Mooney viscosity interpolymers of vinyl acetate, ethylene and reactive halogen-containing monomers are produced and which upon vulcanization using a soap/sulfur cure system have enhanced physical properties, the halogen-containing cure site monomer is charged after the polymerization of the ethylene and vinyl acetate is initiated and as the polymerization proceeds, i.e., during the course of the polymerization. The VCA or other halogen-containing monomer is introduced into the polymerization continuously or intermittently (semi-continuously). While the cure site monomer can be added continuously or discontinuously over the entire polymerization period, more commonly the time period over which the cure site monomer is added comprises at least about one-twentieth to about three-fourths of the total polymerization period. The total polymerization period is the time from the initiation of the polymerization until the ethylene pressure is released and the polymerization terminated, usually about 8–10 hours.

If addition is made in an intermittent manner, periods of cure site monomer addition alternate with periods of monomer withholding. There may be from two to one hundred or more periods of cure site monomer addition and a corresponding number of periods of cure site monomer withholding. Most generally, when adding the VCA on an intermittent basis from five to about ten such periods of VCA cure site monomer addition and withholding are utilized. The length of the addition periods may vary widely and the monomer addition periods may be equal to the monomer withholding periods or different. The rate of cure site monomer addition within each addition period may be constant or variable and may vary from period to period. The said rate can be varied, for example, by varying the rate of pumping of the cure site monomer feed pump. If desired, the rate of cure site monomer addition may be increased until the incremental additions are almost instantaneous as, for example, with a suitable high pressure injection device.

The vinyl chloroacetate or other halogen-containing monomer can be added to the polymerizate either neat or in combination with the vinyl acetate monomer. When diluted with vinyl acetate the halogen-containing monomer will constitute at least 20 weight percent of the mixture. It has quite unexpectedly been found that by adding the VCA during the polymerization in this manner that elastomers having improved physical properties are obtained. It is also within the scope of the present invention to add VCA in vinyl acetate monomers to the polymerization reaction in a periodic manner as disclosed above but at concentrations of 20 weight percent of VCA or more in vinyl acetate monomer.

The pressure at which the E/VA/VCA emulsion interpolymerization is performed may vary broadly over a range of as little as 400 psig to as high as about 4000 psig. The pressure in the polymerization is maintained by feeding ethylene into the reactor by means of an ethylene compressor. The pressure selected will depend on the ethylene content desired in the terpolymer elastomer.

The ethylene pressure may be held at a relatively constant level throughout the polymerization, however, in an especially useful embodiment of the invention the ethylene pressure is increased during the polymerization as the cure site monomer is being introduced as hereinabove disclosed. When the ethylene pressure is increased it generally ranges from about 400–900 psig at the start of the polymerization to about 2000–4000 psig at the end of the polymerization period. Preferably, the ethylene pressure is increased to about 1200 psig within the first 1 to 2 hours of the polymerization and thereafter is gradually increased to the maximum pressure by the end of the total polymerization period. By regulating the ethylene pressure in this manner, E/VA/VCA interpolymer elastomers containing from about 55 to about 65 weight percent of incorporated vinyl acetate and having high tensile strengths upon vulcanization using a conventional soap/sulfur cure system are produced.

When the polymerization process of the invention is carried out in a manner approaching continuous operation, as in two or more reactors in sequence, it is often convenient to operate each of the successive reactors at successively higher but constant ethylene pressures while preferably periodically introducing cure site monomer.

The temperature of the polymerization can range from about 5° C. to about 80° C., however, temperatures of 20° C., to 55° C. are preferred. It is, of course, recognized by those skilled in the art that at the lower temperatures a reducing agent must be employed to generate the free radicals required for initiation of the polymerization by reacting with the aforementioned catalyst. The total time of polymerization may be as little as 1 hour up to as long as 20 hours. However, polymerization times from about 8 to about 10 hours are most common.

The interpolymer elastomers are recovered from the polymerization in the form of a latex. The interpolymer itself may be isolated by adding to the latex a hot saturated aqueous solution of a salt, such as sodium sulfate, sodium chloride or the like. Alternatively, the interpolymer may be recovered from its latex by other methods known to the art, e.g. freezing, spray-drying, etc. Preferably, the recovered interpolymer is next washed to remove residual surface active agent, catalyst residue, salt used for coagulation and other extraneous substances, and dried.

The interpolymer elastomers obtained by the process of this invention are readily compatible with conventional soap/sulfur cure systems and compounding ingredients. The soap, sulfur and other ingredients can be blended into the elastomer by procedures known to the art. The blending may, if desired, be done with any suitable blending equipment such as a two-roll rubber mill, Banbury mixer, twin screw processor, etc.; a two-roll rubber mill is most commonly used.

Soap/sulfur vulcanization systems typically include a long-chain carboxylic acid salt or soap, sulfur, a long-chain fatty acid, and an antioxidant. This type of sulfur vulcanization technology differs from conventional sulfur vulcanization of elastomers containing carbon-carbon double bonds as cure sites and is more fully disclosed in U.S. Pat. No. 3,458,461, 3,939,128 and 3,972,857 which are incorporated herein by reference.

Various filler/reinforcing agents may be employed, although it is within the scope of this invention to vulcanize unfilled compositions. Examples of filler/reinforcing agents are various types of carbon black, e.g., furnace blacks, channel blacks, thermal blacks, and the like. Specific types of carbon black are fast extruding furnace black (Industry Designation: FEF: ASTM No. N550), semireinforcing furnace black (Industry Designation: SRF; ASTM No. N774), and high abrasion furnace black (Industry Designation: HAF; ASTM No. N330). Of these carbon blacks, N550 carbon black is particularly advantageous. Other common filler/reinforcing agents that can be used include various types of silicas, aluminas, and clays, diatomaceous earth, barium sulfide, glass fibers and the like. In general, the best strength properties are achieved where the filler/reinforcing agent is employed at a level of about 30-60 parts per 100 parts of the elastomer. However, this value is only a guideline and from about 25 to 100 parts filler/reinforcing agent may be employed for certain applications.

If desired, minor amounts of other modifying resins or elastomers can be blended with the terpolymer elastomers of this invention. These include various polyethylenes, polypropylenes, EVA and VAE copolymers, polyvinyl chloride, polychloroprene, polyacrylate rubbers, polyurethanes, chlorinated polyethylene, polyesters, ethylene-propylene-diene monomer (EPDM) terpolymers, ethylene-methyl acrylate elastomers, ethylene-butyl acrylate elastomers, butadiene-acrylonitrile elastomers, and other known elastomers and resins. Typically the modifying resin or elastomers will comprise from about 10 to about 40 weight percent of the blend.

The following examples illustrate the invention more fully. All parts and percentages are on a weight basis unless otherwise indicated. Chemicals used, such as vinyl chloroacetate, ammonium persulfate, vinyl acetate, ethylene, stearic acid, sulfur, etc., were good to high purity grades obtained from commercial suppliers or prepared internally. Sodium formaldehyde sulfoxylate dihydrate was used as the reducing agent throughout.

The chlorine content of the interpolymers was determined by a modified Schoeniger method. The vinyl ester content was determined by a saponification procedure. The abbreviation VAM signifies vinyl acetate monomer. Mooney viscosity, ML(1+4)@212° C., was determined according to ASTM D 1646-68 and is often abbreviated MV. Gel contents of the elastomers were determined by placing 3 grams of the polymer in 600 ml of xylene in a covered beaker and stirring for 24 hours with a magnetic stirrer at 80°-90° C. The solution was filtered hot through a weighed coarse porosity glass frit. Any gain in weight was considered to be gel and expressed in percentage of the original sample weight.

Tensile strength and elongation of vulcanized elastomers were determined by ASTM D 412. Whereas tensile and elongation values were measured at different cure times, only the maximum tensile strength and corresponding percent elongation are reported in the examples since this represents the maximum physical strength attainable for the particular vulcanizate.

EXAMPLE I

In accordance with the process of the present invention, a E/VA/VCA terpolymer elastomer was prepared. A one-gallon pressure reactor equipped with an efficient agitator and cooling jacket was employed for the polymerization and charged as follows:

|  | Grams |
| --- | --- |
| Deionized Water | 850 |
| Nonionic Surfactant [Tetronic (trademark) 908] | 26 |
| Anionic Surfactant [Emersal (trademark) 6453] | 4 |
| Ammonium Persulfate | 4 |
| Ferrous Sulfate Heptahydrate | 0.02 |
| Sodium Acetate | 3.2 |
| VAM | 800 |

After purging air from the reactor by pressuring with nitrogen and releasing the pressure several times, the reactor was pressured with ethylene to 1000-1200 psig and heated to about 50° C. with agitation. About 25 mls of a 0.2 weight percent aqueous solution of sodium formaldehyde sulfoxylate reducing agent was then added to initiate the polymerization. After 50 minutes, 4.2 grams vinyl chloroacetate was pumped into the reactor over a 10-minute period. Comparable additions of VCA were made during about the last 10 minutes of each of the next 5 hours until a total of 25 grams VCA was added. The polymerization was then allowed to continue for an additional 2 hours. Throughout the polymerization (including the addition periods) the temperature was maintained at 50° C., ethylene pressure was maintained between about 1280 and 1400 psig, and the solution containing the reducing agent was continuously added at a rate sufficient to maintain the polymerization.

At the conclusion of the 8-hour polymerization period, water was added to reduce the viscosity of the latex and facilitate discharge from the reactor and a small amount of a p-methoxyphenol was added to the latex as a chain-stopper. A hot concentrated aqueous sodium sulfate solution was then added to the latex to coagulate the E/VA/VCA elastomer. After washing with water to remove salts and other extraneous materials, the polymer was dried in a vacuum oven. The E/VA/VCA interpolymer (MV 35.5) showed no evidence of gel and contained 60.3% VA and 0.51% Cl.

In order to evaluate the vulcanizate properties, the elastomer was vulcanized using a soap/sulfur cure system. For the vulcanization, the E/VA/VCA interpolymer was compounded as follows:

|  | Parts |
| --- | --- |
| E/VA/VCA terpolymer | 100 |
| Agerite Resin D (trademark) | 1.0 |
| Sulfur | 0.8 |
| Stearic Acid | 2.0 |
| N550 Carbon Black | 41.0 |
| Premix of equal parts N550 Carbon Black and Sodium-2-Ethylhexanoate | 8.0 |

The ingredients were milled into the elastomer at 150°-170° F. in the order shown using a standard two-roll laboratory mill having 2.5 inch diameter rolls. Total milling time was 20-25 minutes. The E/VA/VCA elastomer exhibited good behavioral characteristics on the mill as a result of the high Mooney viscosity of the elastomer. Tensile strength and percent elongation at break were determined using specimens obtained from vulcanized sheets of the elastomer which were cured in a press at 170° C. Optimum vulcanizate properties (tensile strength 1840 psi at 380% elongation) were developed after 15 minutes cure. Unless otherwise specified, 0.8 g of sulfur was used in all subsequent vulcanizations.

When the polymerization was repeated, except that the ethylene pressure was maintained between 1260 and 1360 psig and the total polymerization time was 9 hours, the resulting VA/E/VCA terpolymer contained 58.6% VA and 0.50% Cl. The elastomer contained no gel and had a Mooney viscosity of 34.5. The interpolymer elastomer, compounded and cured as hereinabove described, had a tensile of 1840 psi and elongation at break of 390%.

Comparison A

To demonstrate the improved results obtained by the process of the present invention and the criticality of adding the vinyl chloroacetate cure site monomer continuously or intermittently during the polymerization, the following comparative experiment was conducted. For the polymerization the following ingredients were charged to a reactor.

|  | Grams |
| --- | --- |
| Deionized Water | 850 |
| Nonionic Surfactant [Tetronic (trademark) 908] | 26 |
| Anionic Surfactant [Emersal (trademark) 6453] | 4 |
| Ammonium Persulfate | 4 |
| Ferrous Sulfate Heptahydrate | 0.02 |
| Sodium Acetate | 3.2 |
| VCA | 37 |
| VAM | 800 |

As in the procedure of Example I, the polymerization was initiated and maintained by the addition of aqueous sodium formaldehyde sulfoxylate (0.5%) after the reactor was pressurized with ethylene. The solution containing the reducing agent was metered into the reactor throughout the course of the 8.5 hour polymerization run. Ethylene pressure ranged between 1150 and 1380 psig during the polymerization. The E/VA/VCA terpolymer was coagulated and recovered in the usual manner and contained 60.0% VA and 0.78% Cl, with a Mooney viscosity of 34.

Three compounded formulations were prepared employing the above-prepared terpolymer in accordance with the following recipes:

|  | Comp A(1) | Comp A(2) | Comp A(3) |
| --- | --- | --- | --- |
| E/VA/VCA Terpolymer | 100 | 100 | 100 |
| N774 Carbon Black | 45 | 45 | 45 |
| Agerite Resin D (trademark) | 1.0 | 1.0 | 1.0 |
| Stearic Acid | 2.0 | 2.0 | 2.0 |
| Sulfur | 0.3 | 0.5 | 0.91 |
| Sodium 2-ethylhexanoate | 4.0 | 4.0 | 4.0 |

The compositions were milled and cured at 170° C. in the usual manner and tensile and elongation values determined. Maximum tensile and elongation obtained for A(1), A(2), and A(3) were 1270 psi (160%), 1480 psi (130%) and 1300 psi (110%), respectively. It is evident from a comparison of these tensile and elongation values with those of Example I that the E/VA/VCA elastomers prepared in accordance with the present invention develop significantly higher tensile properties when vulcanized using conventional soap/sulfur cure systems.

EXAMPLE II

To demonstrate how carbon black affects the tensile/elongation properties of the E/VA/VCA elastomers after soap/sulfur vulcanization Example I and Comparison A were repeated. Different carbon blacks, N550 and N774, were used in compounding the E/VA/VCA elastomers prepared in accordance with Example I and Comparison A. The E/VA/VCA elastomers prepared by the method of Comparison A (identified as Elastomer IIA), in which all the VCA monomer was placed in the reactor at the start, contained 57.7 wt. % VA, 0.74 wt. % Cl, and had a Mooney viscosity of 34. The E/VA/VCA elastomer obtained by the method of Example I wherein the VCA monomer was added periodically (identified as Elastomer IIB) contained 64.3 wt. % VA, 0.71 wt. % Cl, and had an Mooney Viscosity of 36.5.

Elastomers IIA and IIB were compounded and vulcanized as disclosed in Example I, except for varying the carbon black, with the following results:

|  | Elastomer No. | | | | |
| --- | --- | --- | --- | --- | --- |
| Method of Adding | IIA | | | IIB | |
| VCA in Synthesis | at Start | | | Periodically | |
| Carbon Black Used | N774 | N774 | N550 | N774 | N550 |
| Cure Operator | I | II | II | II | II |
| Tensile, psi | | | | | |
| 3 min. | 1130 | 1020 | 1170 | 1430 | 1740 |
| 7 min. | 1150 | 1050 | 1230 | 1400 | 1600 |
| 15 min. | 1110 | 1010 | 1190 | 1560 | 1880 |
| 30 min. | 1120 | 1130 | 1200 | 1480 | 1830 |
| Elongation, % | | | | | |
| 3 min. | 190 | 140 | 130 | 350 | 310 |
| 7 min. | 150 | 140 | 140 | 340 | 250 |
| 15 min. | 150 | 140 | 130 | 400 | 310 |
| 30 min. | 160 | 160 | 140 | 370 | 330 |

From the above data it is evident that the improved process of the present invention in which the VCA cure site monomer is introduced periodically during the polymerization provides higher tensile values with both N774 and N550 carbon black. N550 carbon black, however, uniformly gave higher tensiles and therefore was employed in all subsequent examples of the present invention unless otherwise stated.

EXAMPLES III AND IV

To demonstrate the ability to vary the E/VA/VCA interpolymer composition, two experiments were carried out following the procedure of Example I by increasing the amount of vinyl chloroacetate charged. The VCA monomer was charged in six equal portions during the last 7–10 minutes of each of the first six hours of the polymerization. Experimental details which differ from those described in Example I are set forth in the table. The elastomer and vulcanizate are also characterized in the table.

|  | EX. III | EX. IV |
| --- | --- | --- |
| Ethylene Pressure (psig) | 1270–1430 | 1110–1160 |
| Vinyl Chloroacetate (Total Grams Charged) | 30 | 40 |
| Polymerization Time (Total Hours) | 9 | 8 |
| Elastomer: | | |
| % Vinyl Acetate | 61.4 | 67.3 |
| % Chlorine | 0.65 | 0.91 |
| Mooney Viscosity | 33 | 39.5 |
| Vulcanizate: | | |
| Tensile Strength (psi) | 1830 | 1800 |
| Elongation (%) | 340 | 260 |

EXAMPLES V AND VI

Further process variation is demonstrated by the following two experiments wherein the ammonium persulfate-sodium sulfoxylate catalyst system was replaced with a hydrogen peroxide-sodium formaldehyde sulfoxylate catalyst system. For these experiments the following charges were made:

|  | Grams | |
| --- | --- | --- |
|  | EX. V | EX. VI |
| Deionized Water | 850 | 850 |
| Tetronic (trademark) 908 | 26 | 26 |
| Emersal (trademark) 6453 | 4 | 4 |
| Sodium Formaldehyde Sulfoxylate | 1.5 | 2 |
| Ferrous Sulfate Heptahydrate | 0.02 | 0.02 |
| Formic Acid | 0.4 | 0.4 |
| VAM | 800 | 800 |

The reactors were heated and pressurized with ethylene in the usual manner; however, to initiate and maintain the polymerization aqueous hydrogen peroxide (0.5%) was continuously metered into the reactor. Vinyl chloroacetate was charged in 6 equal portions during the last 10 minutes of each of the first 6 hours by polymerization. A total of 32.5 grams vinyl chloroacetate was charged for each reaction. The E/VA/VCA terpolymer elastomers were recovered, compounded, and vulcanized in the usual manner. Polymerization times and ethylene pressures for the reaction and characteristics of the unvulcanized elastomeric products were as follows:

|  | EX. V | EX. VI |
| --- | --- | --- |
| Ethylene Pressure (psi) | 1280–1480 | 1290–1410 |
| Polymerization Time (Total Hours) | 9 | 8.5 |
| Elastomer: |  |  |
| % Vinyl Acetate | 62.8 | 63 |
| % Chlorine | 0.7 | 0.71 |
| Mooney Viscosity | 24.5 | 26 |
| Vulcanizate: |  |  |
| Tensile Strength (psi) | 1810 | 1870 |
| Elongation (%) | 320 | 310 |

EXAMPLE VII

This experiment was conducted to demonstrate the further ability to improve elastomer properties. The reaction was carried out in accordance with the general procedure of Example I except that the ethylene pressure was increased during the polymerization. All of the vinyl acetate monomer was charged to the reactor at the outset and the vinyl chloroacetate (32 grams) was charged intermittently during the first six hours' polymerization. The initial ethylene pressure was 720 psig; however, the pressure was increased over the first 1½ hours of polymerization to 1200 psig. The ethylene pressure was further increased over the remainder of the polymerization run (total polymerization time 8.5 hours) to a final pressure of 2100 psig. The E/VA/VCA terpolymer was recovered by the standard procedure and upon analysis shown to contain 65.1% VA and 0.85% Cl. The terpolymer had a Mooney viscosity of 44.

The E/VA/VCA elastomer was compounded in accordance with the formulation of Example I and vulcanized at 170° C. for 30 minutes. The vulcanizate after a 30-minute cure time had a tensile strength of 1920 psi and 240 percent elongation. It is apparent from the above data that further improvement in the Mooney viscosity and tensile properties of E/VA/VCA elastomers is possible when, in addition to having all of the VAM present at the outset of the polymerization and introducing the VCA intermittently to the reactor during polymerization, the ethylene pressure is increased over the course of the polymerization.

EXAMPLE VIII

Example VII was repeated except that the total polymerization time was increased to 9.75 hours. For this interpolymerization, the initial ethylene pressure was 720 psig. After commencement of polymerization, the ethylene pressure was increased to 1200 psig within one hour and in the remaining 8.75 hours gradually increased to 2450 psig. The E/VA/VCA elastomer had a Mooney viscosity of 36 and contained 62.4% VA and 0.93% Cl. The elastomer had a maximum tensile of 1940 psi at 240 percent elongation upon vulcanization at 170° C. using a standard soap/sulfur cure system.

EXAMPLE IX

The ability to add the vinyl chloroacetate cure site monomer continuously is demonstrated by the following example which followed the general procedure of Example I and utilized the same reactant charge. After the reactor was pressured with ethylene to about 1320 psig the polymerization was initiated by the addition of the aqueous sodium formaldehyde sulfoxylate solution. After 3 hours, vinyl chloroacetate (40 grams) was continuously metered into the reactor over a 1½-hour period and the polymerization continued for an additional 5¼ hours. The reducing agent solution was continuously added over the entire polymerization period and the ethylene pressure was maintained in the range 1320 to 1410 psig. The E/VA/VCA terpolymer, recovered in the usual manner, had a Mooney viscosity of 36 and contained 58.3% VA and 0.47 weight percent Cl. Upon vulcanization the elastomer had a tensile of 1680 psi and elongation of 280 percent.

EXAMPLE X

A variation on the continuous addition procedure is demonstrated by the following example wherein the vinyl chloroacetate monomer was diluted with a portion of the vinyl acetate monomer. The reaction was carried out similar to Example VIII except that only 700 grams VAM was charged to the reactor. The remaining 100 grams VAM was combined with 32 grams VCA (24% concentration of VCA) and the resulting solution continuously and uniformly metered into the reactor over a period of six hours after initiation of the polymerization. Ethylene pressure ranged from 1240 psig to 1410 psig during the run (total polymerization time 7½ hours). The resulting E/VA/VCA elastomer had a Mooney viscosity of 33 and contained 59.4% VA and 0.60% Cl. Conventional soap/sulfur vulcanization at 170° C. produced a vulcanizate having maximum tensile of 1730 psi and 260 percent elongation after 7 minutes cure.

Comparison B

To demonstrate the criticality of having all or at least a major portion of the vinyl acetate monomer present at the outset of polymerization, the procedure of Example X was repeated except that 300 grams VAM and 13.9 grams VCA were charged to the reactor. A solution of 23.1 grams vinyl chloroacetate in 500 grams VAM (4.7% concentration of VCA) was then prepared and continuously and uniformly metered into the reactor during the first 6.3 hours of polymerization. Ethylene pressure ranged between 1160 psig and 1380 psig throughout the run (total polymerization time 10 hours). The resulting E/VA/VCA elastomer contained 55.7% VA and 0.81% Cl. The elastomer had a Mooney viscosity of only 13 and upon vulcanization (using N774 carbon black) had a maximum tensile strength of only 1010 psi and 250 percent elongation. By repeating the polymerization at a lower ethylene pressure (920–960 psig), it was possible to increase the VA and VCA contents of the elastomer (62.4% VA and 1.02% Cl) and slightly improve the tensile value of the vulcanizate (1240 psi at 200% elongation). The Mooney viscosity of the elastomer, however, remained essentially unchanged (MV 14). Even if N550 carbon black had been used instead of N774 in the compounding, it would not be possible to develop tensiles comparable to those obtained with the elastomer of Example X.

We claim:

1. In a process for the interpolymerization of ethylene, vinyl acetate, and a halogen-containing cure site monomer selected from the group consisting of vinyl chloroacetate, vinyl 2-chloropropionate, vinyl 2-chlorobutyrate, vinyl 2-chloroisobutyrate, and 2-chloroethyl vinyl ether in an aqueous emulsion containing a nonionic surface active agent, an anionic surface active agent, and a free radical polymerization catalyst to obtain soap/sulfur vulcanizable elastomer containing from 40 to 70 weight percent vinyl acetate and 0.2 to 2 weight percent chlorine, the improvement which comprises conducting the polymerization at a temperature from 5° C. to 80° C. and ethylene pressure of 400–4000 psig and adding the halogen-containing monomer after the polymerization is initiated continuously or intermittently over at least one-twentieth of the total polymerization period.

2. The process of claim 1 wherein all of the vinyl acetate monomer is present when the polymerization is initiated.

3. The process of claim 1 wherein a major portion of the vinyl acetate monomer is present when the polymerization is initiated and a minor portion of said monomer is introduced thereafter.

4. The process of claim 3 wherein the minor portion of the vinyl acetate monomer is combined with the halogen-containing vinyl monomer and introduced continuously or intermittently therewith during the polymerization.

5. The process of claims 1, 2, 3, or 4 wherein the polymerization is conducted at a temperature from 20° C. to 55° C. and the halogen-containing vinyl monomer is vinyl chloroacetate.

6. The process of claim 5 wherein the elastomer contains 55 to 65 weight percent vinyl acetate and 0.5 to 1 weight percent chlorine.

7. The process of claim 6 wherein the free radical catalyst is selected from the group consisting of hydrogen peroxide, sodium perchlorate, sodium perborate, sodium poersulfate, potassium persulfate, and ammonium persulfate and is resent in an amount from 0.05 to 3 weight percent, based on the vinyl acetate monomer.

8. The process of claim 7 wherein a reducing agent selected from the group consisting of sodium hydrogen sulfite, sodium meta bisulfite, sodum hydrosulfite, and sodium formaldehyde sulfoxylate is employed as a co-catalytic agent.

9. In a process for the interpolymerization of ethylene, vinyl acetate, and a halogen-containing monomer selected from the group consisting of vinyl chloroacetate, vinyl 2-chloropropionate, vinyl 2-chlorobutyrate, vinyl 2-chloroisobutyrate, and 2-chloroethyl vinyl ether in an aqueous emulsion containing a nonionic surface active agent, an anionic surface active agent, and a free radical polymerization catalyst to obtain soap-sulfur vulcanizable elastomer containing from 40 to 70 weight percent vinyl acetate and 0.2 to 2 weight percent chlorine, the improvement which comprises conducting the polymerization at a temperature from 5° C. to 80° C., adding the halogen-containing monomer after the polymerization is initiated continuously or intermittently over at least one-twentieth of the total polymerization period, and increasing the ethylene pressure during the polymerization from 400–900 psig at the outset up to 2000–4000 psig by the end of the polymerization period.

10. The process of claim 9 wherein all of the vinyl acetate monomer is present when the polymerization is initiated.

11. The process of claim 9 wherein a major portion of the vinyl acetate monomer is present when the polymerization is initiated and a minor portion of said monomer is introduced thereafter.

12. The process of claim 11 wherein the minor portion of the vinyl acetate monomer is combined with the halogen-containing vinyl monomer and introduced continuously or intermittently therewith during the polymerization.

13. The process of claims 9, 10, 11, or 12 wherein the polymerization is conducted at a temperature from 20° C. to 50° C. and the halogen-containing vinyl monomer is vinyl chloroacetate.

14. The process of claim 13 wherein the ethylene pressure is increased to about 1200 psig within the first one to two hours of polymerization.

15. The process of claim 14 wherein the elastomer contains 55 to 65 weight percent vinyl acetate and 0.5 to 1 weight percent chlorine.

16. The process of claim 15 wherein the free radical catalyst is selected from the group consisting of hydrogen peroxide, sodium perchlorate, sodium perborate, sodium persulfate, potassium persulfate, and ammonium persulfate and is present in an amount from 0.05 to 3 weight percent, based on the vinyl acetate monomer.

17. The process of claim 16 wherein a reducing agent selected from the group consisting of sodium hydrogen sulfite, sodium meta bisulfite, sodium hydrosulfite, and sodium formaldehyde sulfoxylate is employed as a co-catalytic agent.

* * * * *